United States Patent Office 3,098,879
Patented July 23, 1963

3,098,879
TRIOLS
Gustav Erlemann, Riehen, and Waldemar Guex, Rudolf Ruegg, and Sidney Frank Schaeren, Bottmingen, Switzerland, assignors to Hoffmann-La Roche Inc., Nutley, N.J., a corporation of New Jersey
No Drawing. Filed Aug. 22, 1961, Ser. No. 133,072
Claims priority, application Switzerland Sept. 7, 1960
4 Claims. (Cl. 260—635)

The present invention relates to novel triols. More particularly, it relates to novel aliphatic 1,2,3-triols, to processes for their preparation, and to their use in skin and hair cosmetic preparations.

The novel triols of the invention have the formula:

(I) 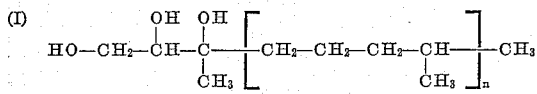

wherein $n$ is a whole number ranging from 1–3.

The process of the invention is carried out by reacting a compound having the formula:

(II) 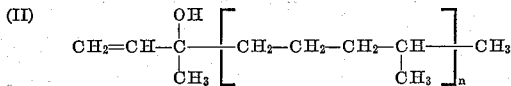

wherein $n$ is a whole number ranging from 1–3, with an organic peracid and hydrolyzing the reaction product therefrom.

The organic peracids that can be employed in the process of the invention are preferably the lower aliphatic peracids, for example, performic acid, peracetic acid, perpropionic acid, etc., preferably performic acid. However, perbenzoic acid and alkyl substituted perbenzoic acids can also be employed.

The hydrolyzing agents that can be employed in the process of the invention are aqueous alkaline hydrolyzing agents, for example, aqueous alkalis, e.g. sodium hydroxide or potassium hydroxide solutions, or, preferably, concentrated ammonia.

Compounds of Formula II useful as starting materials in the present process include isophytol, tetrahydronerolidol (3,7,11-trimethyl-3-hydroxydodecaene-1) and dihydrolinalool (3,7-dimethyl-3-hydroxyoctaene-1), with the first two being preferred.

The process of the invention involves several intermediates as shown in the following reaction scheme:

(II) 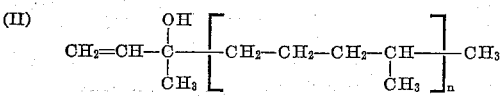

(III) 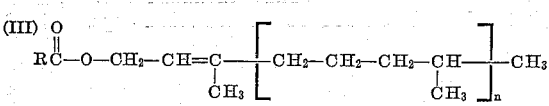

(IV) 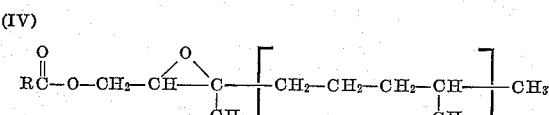

(V) 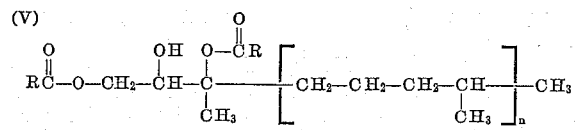

(I) 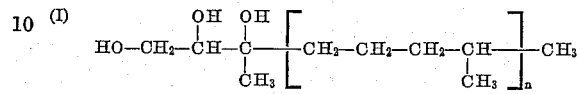

In Formulas III through V the R group depends on the particular peracid employed and is either hydrogen, a $C_1$–$C_6$ alkyl group, a phenyl group, or an alkyl substituted phenyl group. In Formulas III through V, $n$ has the same meaning as in Formulas I and II.

The first step of the reaction, i.e. converting compounds of Formula II to compounds of Formula III, is carried out by reacting compounds of Formula II with a concentrated lower aliphatic or aromatic carboxylic acid corresponding to the peracid to be employed. Then a peracid is introduced into the reaction mixture which results in the formation of the epoxide IV which, in the presence of the concentrated carboxylic acid, is converted into a compound of Formula V. It is preferable to allow the allylic rearrangement of compounds of Formula II to compounds of Formula III to take place almost completely before the hydroxylation with the peracid is begun. This can suitably be carried out by reacting the starting material first with a lower aliphatic carboxylic acid alone until complete allyl rearrangement has taken place, and then introducing hydrogen peroxide into the mixture to form the peracid in situ. The process of the invention is preferably carried out at room temperature, although slightly higher temperatures, for example up to about 40° C., can be employed. At 40° the reaction is completed after a few hours.

Hydrolysis of compounds of Formula V to form compounds of Formula I is carried out as discussed above with alkaline hydrolyzing agents. Concentrated ammonia is preferred since the excess ammonia and the water can easily be removed by reducing the pressure. A viscous oil, readily soluble in ether, is obtained thereby. It can easily be separated from the ammonium salts formed in the reaction by treatment with water. The product can be used directly or purified through molecular distillation.

The compounds of Formula I have properties which render them especially useful in the cosmetic art, particularly in cosmetic preparations for the treatment of skin and hair. These compounds are not gummy or oily, yet they leave the hair and skin soft and velvety. They form an invisible, protective layer over the skin which is water-repellent, yet at the same time does not interfere with the skin's respiration. Additionally, the compounds are very stable and can be used in the form of emulsions, salves and lotions. They can also be combined with other active ingredients, such as vitamins, hormones, fungicides, and bactericides.

The concentration of the compounds of the invention that can be employed to form the skin and hair preparations of the invention is in the range of from about 0.1 to about 10 percent by weight based on the weight of the preparation. However, since the desired cosmetic activity is already obtained at concentrations as low as 0.1 percent, from about 0.1 to about 3 percent is preferred.

The other ingredients used to make up the skin and hair preparations of the invention are conventional in the cosmetic art and do not comprise part of the invention. See De Navarre, The Chemistry and Manufacture of Cosmetics, published by Van Nostrand (1941), page 65 et seq. for examples of conventional bases for hair and skin lotions, creams, salves, emulsions, etc.

The invention will be better understood by reference to the following examples which are given for illustration purposes only and are not meant to limit the invention.

*Example 1*

Into a reaction vessel containing a stirrer, thermometer, and dropping funnel, 200 g. of isophytol and 570 ml. of formic acid are added and the homogeneous mixture stirred for 2 hours at 40° C. Thereafter the reaction mixture is cooled to 20°, and, during the course of 15 minutes, a solution of 83 g. of 30 weight percent hydrogen peroxide and 11 ml. of water is added thereto. The temperature of the reaction mixture climbs slowly and is maintained at 40° with the help of an ice-bath. Since the temperature, after about 1 hour, falls below 40° without cooling, the mixture is maintained at 40° for another 2 hours with the help of a water-bath. Thereafter the reaction mixture is poured into a mixture of 1 liter of ice-water and 500 ml. of ether. The aqueous layer is removed and the ether solution washed twice, each time with 150 ml. of water. The ether is removed and the residue treated with 300 ml. of concentrated ammonia (25%). The resulting mixture is shaken well and then allowed to stand for 15 minutes at room temperature. The water and the ammonia are then removed in a rolling evaporator at 50° by use of a water-pump, and the viscous residue taken up in 1500 ml. of ether. The ether solution is washed 3 times, each time with 200 ml. of water, dried over sodium sulfate, filtered, and the ether evaporated off. 220 g. of 3,7,11,15-tetramethyl-1,2,3-trihydroxyhexadecane (dihydro-dihydroxyphytol) in the form of a bright yellow, viscous oil is obtained which boils at 130°/0.01 mm.

*Example 2*

150 g. of 3,7,11-trimethyl-3-hydroxydodecaene-1 is treated as in Example 1 with 570 ml. of formic acid, then with a solution of 83 g. of hydrogen peroxide and 11 ml. of water and worked up as in Example 1. 155 g. of 3,7,11-trimethyl-1,2,3-trihydroxydodecane is obtained in the form of a bright yellow, viscous oil which is distilled under high vacuum, B.P. 146°/0.07 mm.

*Example 3*

105 g. of 3,7-dimethyl-3-hydroxyoctaene-1 is treated with 570 ml. of formic acid, then with a solution of 83 g. of hydrogen peroxide and 11 ml. of water and worked up according to the procedure of Example 1. 107 g. of 3,7-dimethyl-1,2,3-trihydroxyoctane is obtained in the form of a bright yellow oil which distills in high vacuum, B.P. 115°/0.07 mm. The product crystallizes upon standing at room temperature.

*Example 4*

For the preparation of toilet water, 0.5 g. of dihydro-dihydroxyphytol and 0.5 g. of panthenol are dissolved in 49 g. of 96 percent alcohol and mixed with 50 g. of water. The resulting solution can be perfumed as desired.

*Example 5*

0.5 g. of dihydro-dihydroxyphtol is mixed with 0.5 g. of panthenol, 10.0 g. of a 1 percent polyacrylic acid solution in water, 0.1 g. of triethanolamine and 88.9 g. of water. The resulting mixture is useful as a facial lotion to which perfume can be added as desired.

*Example 6*

1.0 g. of dihydro-dihydroxyphytol is mixed with 1.0 g. of 3,7-dimethyl-1,2,3-trihydroxyoctane, 1.0 g. of hydroxyethylated oleyl alcohol, 10.0 g. of 96 percent alcohol, and 87.0 g. of a 1 percent alginate solution in water. The resulting mixture, useful as a hand lotion, can be perfumed as desired.

*Example 7*

1.0 g. of dihydro-dihydroxyphytol, 1.0 g. of 3,7,11-trimethyl-1,2,3-trihydroxydodecane are mixed with 1.0 g. of 3,7-dimethyl-1,2,3-trihydroxyoctane, 0.5 g. of panthenol, and 26.5 g. of 96 percent alcohol. After suitable addition of perfume, the mixture is mixed with 90 g. of a commercial aerosol gas mixture, such as chlorinated or fluorinated hydrocarbons, and introduced into an aerosol atomizer. The resulting spray preparation can be used as a hand or skin lotion.

*Example 8*

3.0 g. of polyvinylpyrrolidone is mixed with 0.5 g. of dihydro-dihydroxyphytol, 0.2 g. of panthenol, 46.3 g. of 96 percent alcohol (or isopropyl alcohol), and 50.0 g. of water, and the resulting mixture perfumed as desired. The resulting cosmetic preparation is especially useful as a hair tonic, rendering the hair easy to comb.

*Example 9*

0.3 g. of 3,7,11-trimethyl-1,2,3-trihydroxydodecane is mixed with 0.3 g. of 3,7-dimethyl-1,2,3,-trihydroxyoctane, 0.5 g. of panthenol, 0.2 g. of N,N'-bis[1-methyl-3-(2,2,6-trimethylcyclohexyl)-propyl]-N,N'-dimethyl-1,6-hexadiamine-bis-(methochloride), 49.0 g. of 96 percent alcohol (or isopropyl alcohol), and 50.0 g. of water. The resulting hair tonic can be perfumed as desired.

Variations in the process and products of the invention can be undertaken by those skilled in the art without departing from the scope or purpose of the invention.

We claim:

1. A compound having the formula $$HO-CH_2-CH-\underset{CH_3}{\underset{|}{C}}-\left[-CH_2-CH_2-CH_2-\underset{CH_3}{\underset{|}{CH}}-\right]_n-CH_3$$

with OH, OH on the first two carbons.

wherein $n$ is a whole number ranging from 1–3.

2. 3,7,11,15-tetramethyl-1,2,3-trihydroxyhexadecane.
3. 3,7,11-trimethyl-1,2,3-trihydroxydodecane.
4. 3,7-dimethyl-1,2,3-trihydroxyoctane.

References Cited in the file of this patent

UNITED STATES PATENTS 2,492,201   Swern et al. _____ Dec. 27, 1949
2,902,495   Webb _____ Sept. 1, 1959